United States Patent [19]

Matsui

[11] Patent Number: 5,812,515
[45] Date of Patent: Sep. 22, 1998

[54] APPARATUS AND METHOD FOR PLAYING BACK OPTICAL RECORDING HAVING HIGH LINEAR DENSITY

[75] Inventor: Tsutomu Matsui, Tokyo, Japan

[73] Assignee: NEC Corporation, Tokyo, Japan

[21] Appl. No.: 613,181

[22] Filed: Mar. 8, 1996

[30] Foreign Application Priority Data

Mar. 9, 1995 [JP] Japan ................................ 7-049706

[51] Int. Cl.⁶ ....................................................... G11B 7/00
[52] U.S. Cl. ........................................ 369/124; 369/44.37
[58] Field of Search ................................ 369/44.37, 44.38, 369/44.41, 13, 100, 54, 59, 124, 110, 109, 121

[56] References Cited

U.S. PATENT DOCUMENTS

| | | | |
|---|---|---|---|
| 4,475,183 | 10/1984 | Marchant et al. | 369/59 |
| 4,890,275 | 12/1989 | Mori | 369/59 |
| 4,935,913 | 6/1990 | Shinoda | 369/109 |
| 5,043,960 | 8/1991 | Nakao et al. | 369/54 |
| 5,093,822 | 3/1992 | Kugiya et al. | 369/13 |
| 5,164,933 | 11/1992 | Matsueda | 369/59 |
| 5,218,584 | 6/1993 | Gfeller . | |
| 5,517,471 | 5/1996 | Ashinuma et al. | 369/54 |
| 5,570,334 | 10/1996 | Kim | 369/44.37 |

FOREIGN PATENT DOCUMENTS 5-225573  9/1993  Japan .

Primary Examiner—Thang V. Tran
Attorney, Agent, or Firm—Young & Thompson

[57] ABSTRACT

A 0-th order diffracted beam and a plus order diffracted beam generated by passing a single beam emitted from a semiconductor laser through a diffraction grating are focused on a recorded mark on an optical track. Signals of reflected light of the two beams from the recorded mark are detected by a two-element sensor. A difference between the signals is calculated by a differential amplifier. The difference signal is differentiated by a differentiator and the differentiated signal input into a zero cross detector which detects a zero cross point of the differentiated signal. Information represented by the recorded mark is played back according to the zero cross point detected by the zero cross detector.

18 Claims, 4 Drawing Sheets

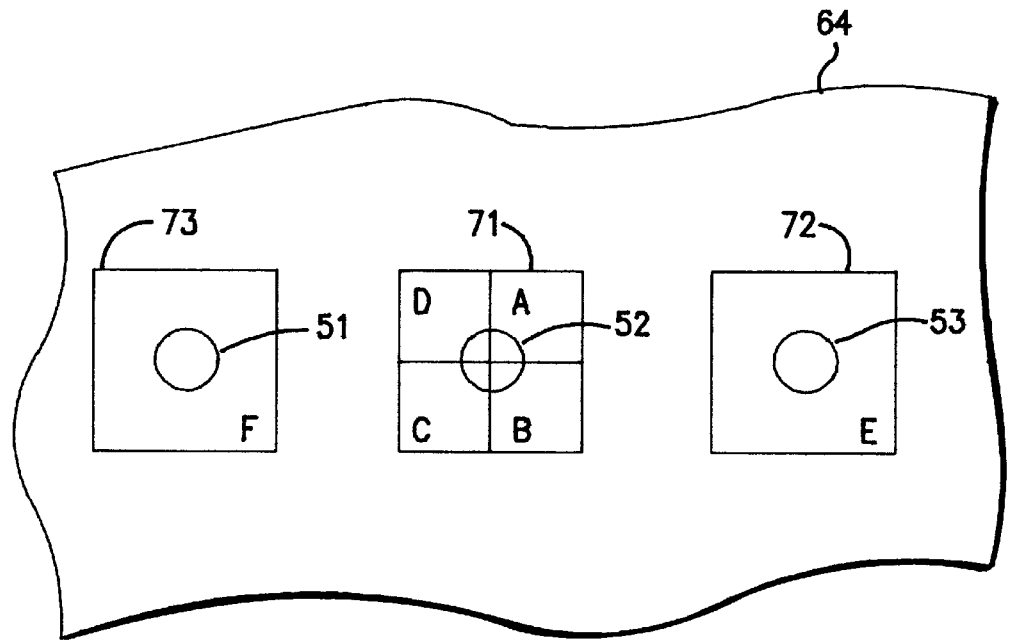
FIG. 5
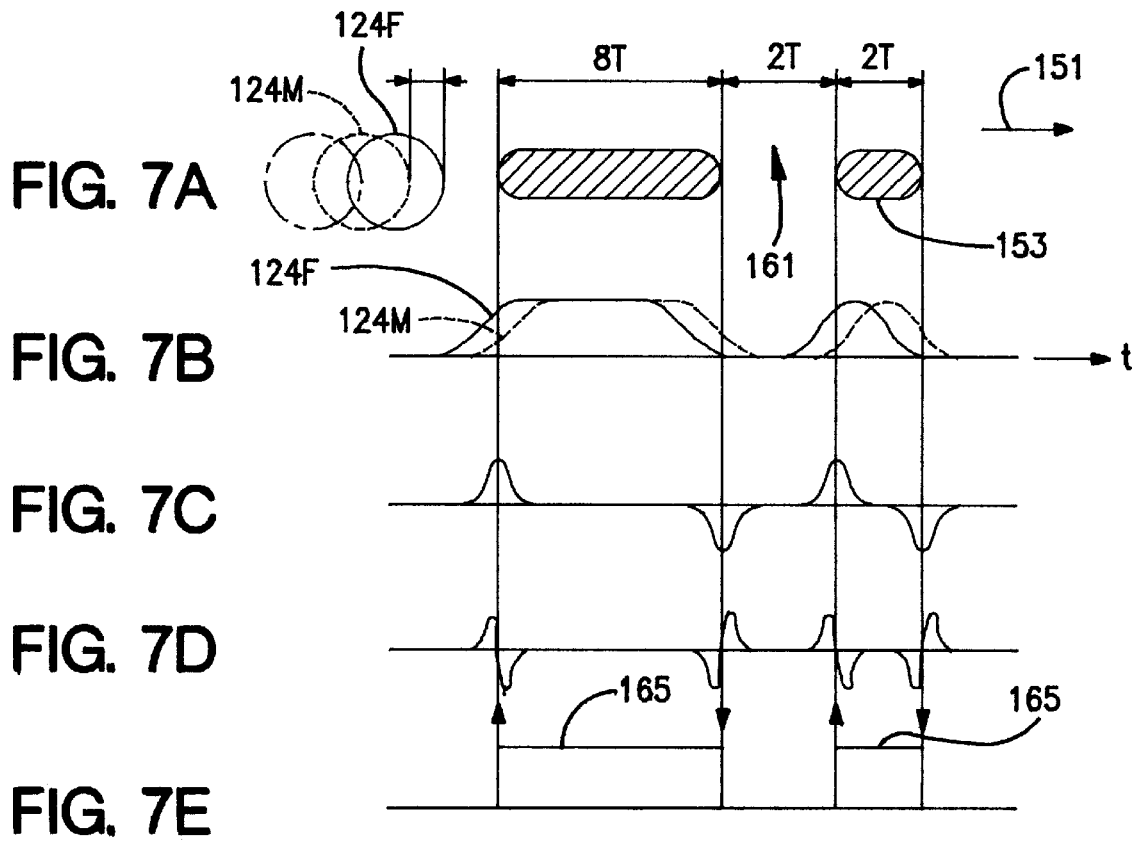
FIG. 7A
FIG. 7B
FIG. 7C
FIG. 7D
FIG. 7E

APPARATUS AND METHOD FOR PLAYING BACK OPTICAL RECORDING HAVING HIGH LINEAR DENSITY

BACKGROUND OF THE INVENTION

1. Field of the Invention

The present invention relates to an apparatus for optically recording and playing back and method for playing back marks recorded on an optical disk or the like, and, more particularly, to an apparatus for optically recording and playing back and method therefor suitable for playing back information which has been recorded on an optical disk at a high density.

2. Description of the Related Art

There is a demand for memory storage devices having both high speed accessibility and a high storage capacity. Development of such storage devices is proceeding in earnest. The optical disk is a promising candidate in such work, as a storage medium having high transfer rate, high speed random accessing, and high storage capacity. The optical disk is further a medium excellent in preservation and durability because of its non-contact feature.

Various technologies have been developed in order to increase the density of optical recording. For example, these technology developments include a super-resolution optical head, a super-resolution disk with dual layer structure, use of shorter wavelength for the semiconductor laser or higher numerical aperture of an objective lens, and signal processing using a partial response method. The density of optical disk may be further increased by combining these techniques. However, if the numerical aperture of 0.55 of the objective lens is the upper limit to obtain stable disk inclination characteristics, it has been said that the upper limit of high density recording is at a bit length of about ⅓ the laser wavelength.

A conventional optical record playback apparatus for an optical disk with high density recording is shown in FIG. 1. A disk medium 11 which is a super-resolution disk has a two-layered film structure provided by magnetic recording. An objective lens 12 with high numerical aperture is disposed under the disk medium 11. A laser beam output from a short wavelength laser 13 is focused by a collimator lens 14, and is incident on the objective lens 12 through a beam splitter 15 and a reflecting mirror 16 so as to be focused on a predetermined location on the disk medium 11.

A light beam reflected by the disk medium 11 and modulated according to the recorded information is further reflected by the reflecting mirror 16 and the beam splitter 15 after passing through the objective lens 12 to be incident on a photosensor 18. The signal opto-electrically converted by the photosensor 18 is amplified by a head amplifier 19, processed in the signal processing section 21 to be converted into a digital signal, and then input into a Viterbi decoder 22 for bitwise correction of error in the waveform response.

In other words, when playing back information recorded on the disk medium 11 with dual layer structure, a window for reading the information is formed in the first film for reading recorded signals in the second film. Focusing of the light beam for reading the information requires the above-mentioned laser 13 outputting a short wavelength, and an objective lens 12 of high numerical aperture. In addition, a light shield 24 is disposed on the optical axis between the collimator lens 14 and the beam splitter 15 so that the light impinging on light shield 24 cannot reach the disk medium 11.

When the rays at the center of the laser beam are shielded, the total amount of light focused on the disk medium 11 decreases. However, there is an advantage that the beam becomes a super-resolution beam 26 as indicated by a solid line, in which the beam diameter is decreased in 80% diameter at $e^{-2}$ normalized intensity of the focussed beam. On the other hand, a broken line 27 represents the focused beam when the light shield 24 is not provided. An indicated by an ellipse of solid line and an ellipse of broken line, the diameter of beam is reduced by providing the light shield 24.

The super-resolution beam 26 consists of a main beam 26 contributing to reading at high resolution and an outer annulus 29 surrounding it. Presence of the annulus 29 causes the phase transfer function (PTF) of the optical transfer function (OTF) to significantly deteriorate when reading an image.

In the optical record and playback apparatus for high density recording shown in FIG, 1, a signal detected through opto-electrical conversion by the photosensor 18 is amplified by the head amplifier 19, and passed through a transversal filter (TVF) 31 in the signal processing section 21. Then, automatic gain control is effected by an AGC circuit 32 to make the output constant, and input into an equalizer 33 for improvement of its frequency characteristics, Subsequently, it is converted into a digital signal by an A/D convertor 34, and input into a Viterbi decoder 22 to perform partial response maximum likelihood (PRML) signal processing for bitwise correcting of error in the waveform response.

The conventional playback apparatus shown in FIG. 1 can play back a record bit length of only ½ or 0.5 times the laser wavelength, even when the numerical aperture of the objective lens is established as high as 0.55. Thus, the conventional technology is considered to be limited to playback of a record bit length 0.5 times the laser wavelength.

Furthermore, other conventional playback apparatus is disclosed in Japanese Laid-Open Patent Application No. Hei 5-225573. In this conventional apparatus, two beams are focused on the optical disk and the signals corresponding to the two beams reflected from the disk are detected. Then, information recorded on the disk is detected according to the difference between the detected signals.

SUMMARY OF THE INVENTION

It is an object of the present invention to provide an apparatus and method for optically recording and playing back capable of playing back information recorded at high density.

It is another object of the present invention to provide an apparatus and method for optically recording and playing back capable of playing back a record whose bit length is much shorter than the laser wavelength.

In order to achieve the above-mentioned objects, the present invention provides an apparatus for optically recording and playing back comprising irradiating means for irradiating a track with at least two light beams, a first detector for detecting signals of reflected light of the two light beams from at least one recorded mark on the track, a differentiator for differentiating a difference signal between the signals detected by the first detector and signal processing means for generating a playback signal corresponding to the recorded mark according to the differentiated signal output from the differentiator.

Further, the present invention provides a method for playing back an optical record, comprising the steps of scanning a track with at least two light beams, detecting signals of reflected light of the two light beams from at least one recorded mark on the track, differentiating a signal indicating a difference between the detected signals and generating a playback signal corresponding to the recorded mark according to the differentiated signal.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 5 is a plan view showing essential parts of the six-split photosensor of FIG. 2;

FIG. 7A is a diagram illustrating the recorded marks and the beam spots irradiated onto the disk;

FIG. 7B is a diagram illustrating the waveforms indicating response signals from the recorded mark;

FIG. 7C is a diagram illustrating the waveforms indicating the difference output from the differential amplifier of FIG. 4;

FIG. 7D is a diagram illustrating the waveforms indicating the signal output from the differentiator of FIG. 4;

FIG. 7E is a diagram illustrating the waveforms indicating the signal output from the zero cross detector of FIG. 4.

DETAILED DESCRIPTION OF THE PREFERRED EMBODIMENTS

Figure 1:
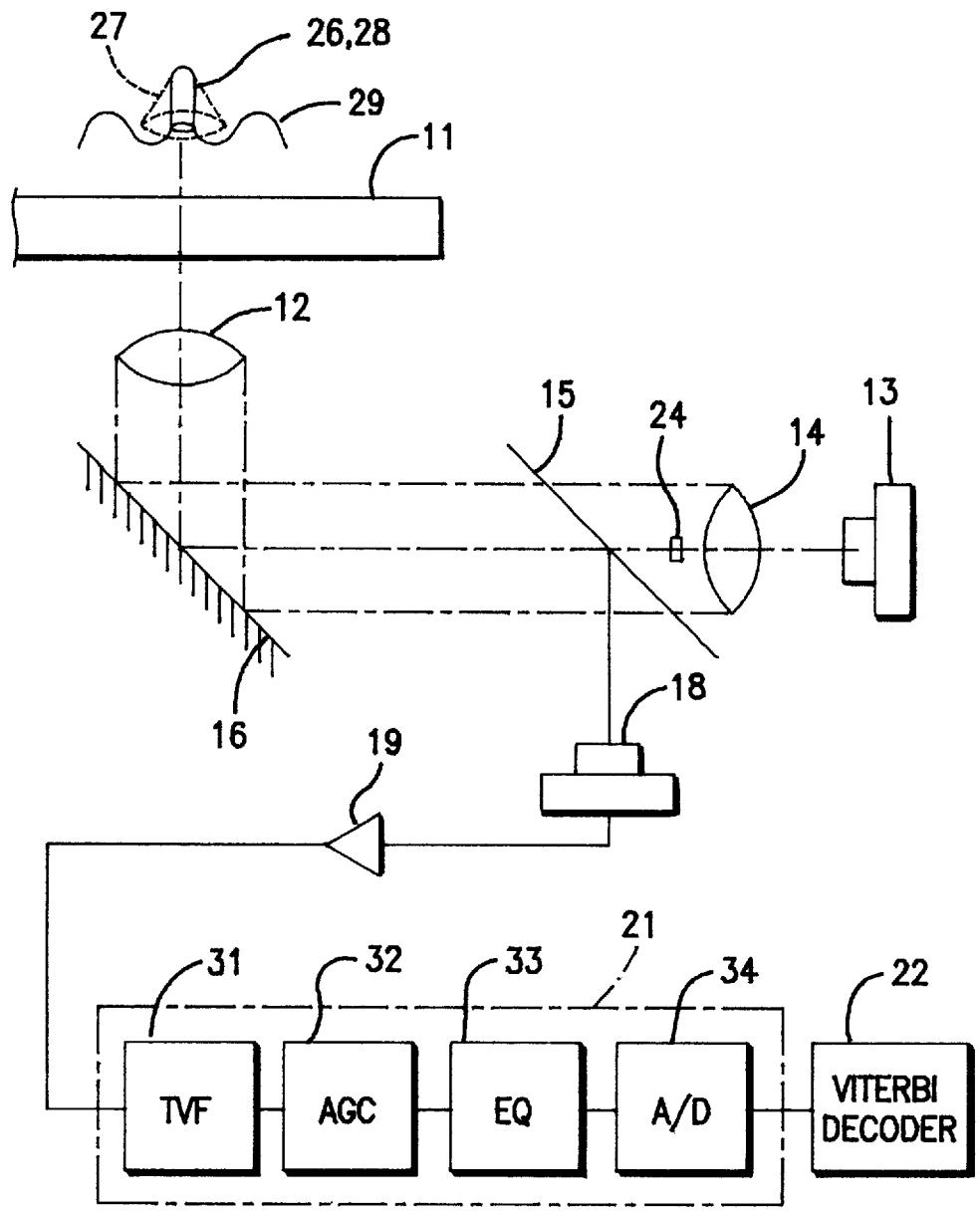
FIG. 1 is a schematic diagram showing a conventional optical record and playback apparatus for an optical disk recorded at high density record.
Figure 2:
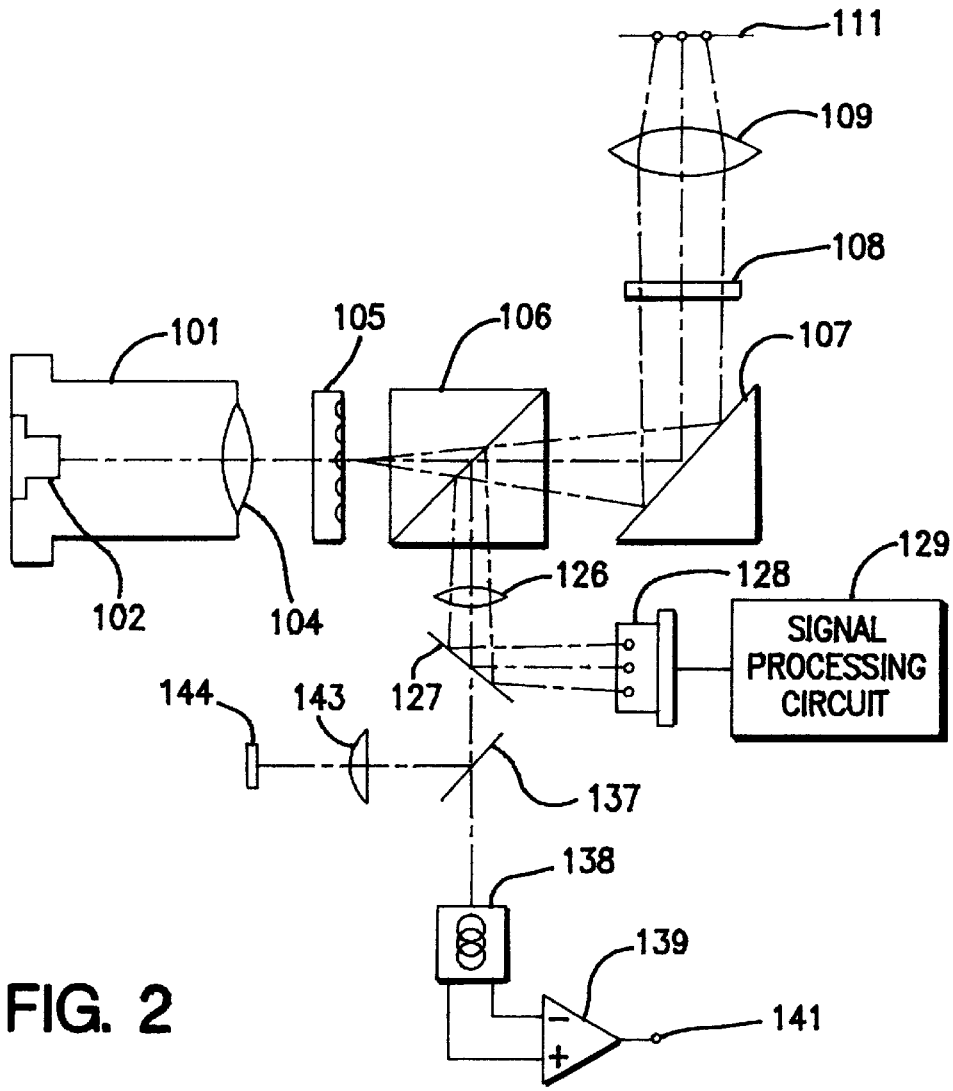
FIG. 2 is a schematic view showing essential parts of the arrangement of an apparatus for optically recording and playing back according to an embodiment of the present invention.

Referring to FIG. 2, the light beam emitted from a semiconductor laser 102 in a laser pen 101 is turned into a parallel light beam by a collimator lens 104 and is incident on a diffraction grating 105. Beams of the 0-th and first order output from the diffraction grating 105 pass straight through a polarized light beam splitter 106, and enter into a 45-degree mirror 17 where they are deflected by 90 degrees. The three laser beams deflected by the 45-degree mirror 107 pass through a quarterwave plate 108 where they are turned into circularly polarized light. Then, they are focused on substantially the same location on an optical disk 111 by an objective lens 109.

Figure 3:
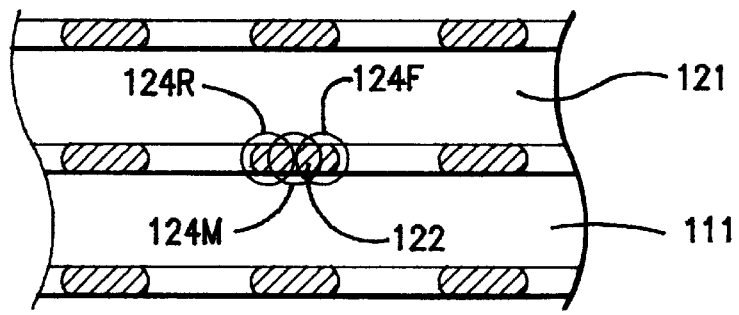
FIG. 3 is a plan view showing three laser beams irradiated onto a disk surface.

A state where three-laser beams are irradiated onto the disk surface is shown in FIG. 3. The three laser beams 124R, 124M, and 124F are focused on a given recorded mark 122 on a predetermined track 121 on the optical disk 111. In this embodiment of the present invention, response from the recorded mark 122 is detected by utilizing slight differences between the focused locations of these three laser beams 124R, 124M, and 124F.

Returning to FIG. 2, reflected light of these laser beams from the optical disk 111 enters into the objective lens 109, proceeding in the reverse sequence as before, and enter into the polarized light beam splitter 106. The reflected beams, deflected 90 degrees by the beam splitter 106, then enter into a convergent lens 126 to reduce beam diameter, The beams then enter into a first beam splitter 127. The beams reflected on the beam splitter 127 are deflected by 90 degrees, and reach a two-element sensor 128 where the beams are opto-electrically converted. The opto-electrically converted signals are provided with a signal processing circuit 129 where a playback signal corresponding to the recorded mark is detected according to the opto-electrically converted signals.

Figure 4:
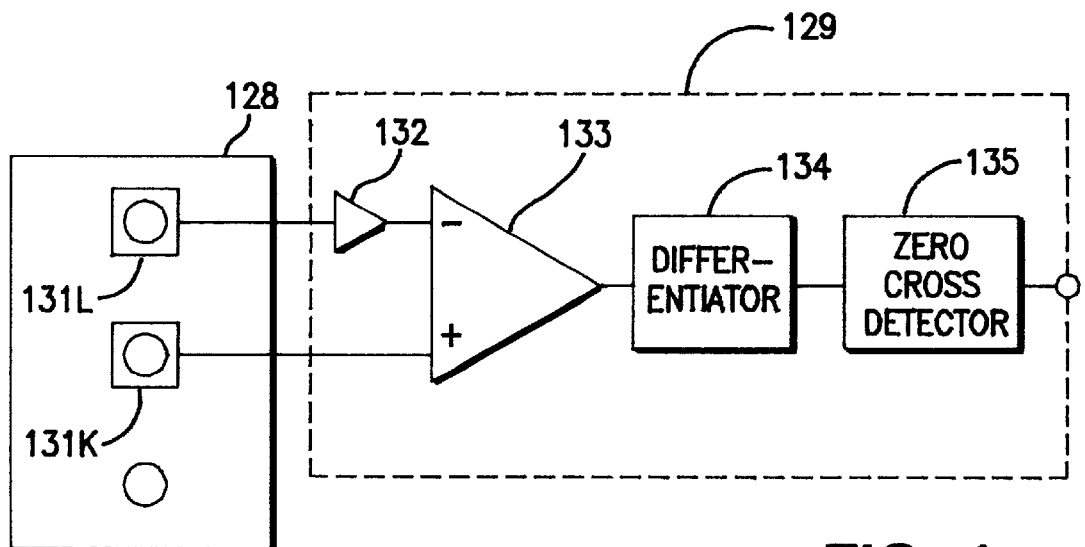
FIG. 4 is a circuit diagram showing the signal processing circuit of FIG. 2.

Referring to FIG. 4, two elements 131L and 131K of the two-element sensor 128 opto-electrically convert the plus one and 0-th order diffracted beams, respectively. An electrical signal converted by the element 131L is input into a variable amplifier 132 for gain control, because the level of the plus one order beam is lower than that of the 0-th order beam. Namely, the electrical signal is adjusted by the variable amplifier 132 so as to reduce a difference between peaks of the signals output from the elements 131L and 131K. Output from the variable amplifier 132 and that from the other element 131K are input into a differential amplifier 133. A difference output obtained by the differential amplifier 133 is differentiated by a differentiator 134. The differentiated signal is input into a zero cross detector 135 to determine precise playback timing for the information recorded on the optical disk 111.

Returning to FIG. 2 again, the laser beams passing straight through the first beam splitter 127 pass straight through a second beam splitter 137 and reach a two-split photosensor 138, On the two-split photosensor 138, the three light beams are not sufficiently focused. Then, the electric signals output from two respective photosensor elements of the two-split photosensor 138 are determined for their difference by a differential amplifier 139 with a well-known one-beam type push-pull method so that a tracking error signal 141 corresponding to the difference between these two photosensor elements can be obtained.

The beams reflected on the second beam splitter 137 and deflected by 90 degrees pass through a cylindrical lens 143, and are incident on a six-split photosensor 144. Referring to FIG. 5, the six-split photosensor 64 consists of a four-split photosensor 71 which is disposed at location irradiated by the 0-th order laser beam 52, and photosensor elements 72 and 73 which are disposed at locations irradiated by the first order laser beam 51 and 53, respectively. It is assumed that output from each of four split photosensor elements of the four-split photosensor 71 is represented by A, B, C and D as shown, respectively, while outputs of the photosensor elements 72 and 73 are represented by E and F.

Then, the 0-th order laser beam 52 is detected as sum of outputs from the four-split photosensor 71 or the astigmatism method, which is expressed by the following equation:

$$RF = A+B+C+D$$

The focusing error signal is detected by using the following equation:

$$FE = (A+C)-(B+D)$$

Here, the references A, B, C, D, E and F represent the outputs of respective photo sensor elements of the six-split photosensor 64.

As described above, the focus error signal and the tracking error signal are detected, furthermore, the three laser beams overlap on the same track 121 as shown in FIG. 2 so that signals corresponding to the recorded mark on the track are played back according to the difference between the plus first order diffracted light beam 124F and the 0-th order diffracted light beam 124M in FIG. 2.

Moreover, in this embodiment, signals corresponding to the recorded mark can be played back according to the difference between the minus first order diffracted beam and the 0-th order diffracted beam.

Figure 6A:
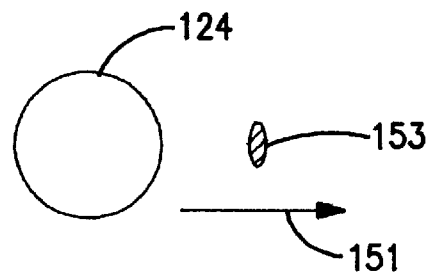
FIG. 6A to 6D are diagrams illustrating the principle for playing back information recorded on the disk using the optical record playback apparatus with multiple beams employed in this embodiment.
Figure 6B:
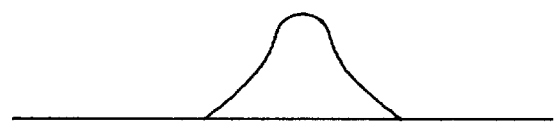
Figure 6C:
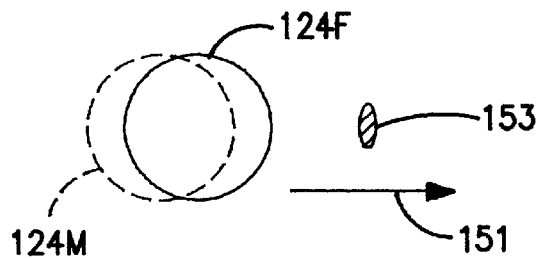

The principle for playing back signals corresponding to the recorded mark using a optical record playback head with multiple beams employed in this embodiment is illustrated in FIG. 6A to FIG, 6D. A light beam 124 advancing in the direction of arrow 151 and a minute recorded mark 153 existing in its path is shown in FIG. 6A. The recorded mark 153 is assumed to be a function expressed by δ (t) which makes the normalized output per unit time "1" which is a maximum value. It is also assumed that a convergent beam 124 with a diameter determined by the laser wavelength and the numerical aperture of the objective lens impinges on the recorded mark 153. An ideal solitary waveform formed of the reflected light of the beam 124 from the recorded mark 153 is shown in FIG. 6B. Signal according to the solitary waveform is found by the following equation (1), which provides a Gaussian waveform h (t).

$$h(t) = \frac{A\exp(-t^2/2\tau^2)}{\sqrt{2\pi} \cdot \tau} \tag{1}$$

where $$\frac{A}{\sqrt{2\pi} \cdot \tau} \tag{2}$$

represents a peak value, and $\tau^2$ represents dispersion,

When such Gaussian waveform is used, it is impossible to attain high density playback. Therefore, the plus first order light beam 124F and the 0-th order light beam 124M as two beams for the same track are prepared in this embodiment as shown in FIG. 6C, and the response from the minute recorded mark 153 is detected with the difference between the two beams. That is, the first order light beam 124F has a smaller amount of light, ⅓ to ⅐ when compared with the 0-th order light beam 124M, but when the output of the element 131L is adjusted by the variable amplifier 132 to have substantially same transient response an the 0-th order light beam, the difference output between the outputs of the elements 131L and 131K can be obtained from the differential amplifier 133 as shown in FIG. 4. This difference output Δh (t) can be represented by the following equation (3).

$$\Delta h(t) = h(t) - h(t-\Delta) \tag{3}$$

Figure 6D:
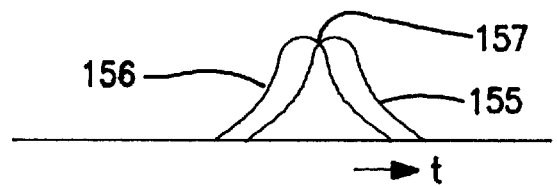

A state where two light beams of the plus first order light beam 124F and the 0-th order light beam 124M advance in the direction of arrow 151 with a slight offset distance is shown in FIG. 6C. Response waveforms from the recorded mark 153 are shown in FIG. 6D. A "valley" 157 exists between peaks of a waveform 155 produce slightly earlier and a following waveform 156. The recorded mark 153 can be detected by the detection of the valley 157.

The response from the recorded mark in this embodiment is specifically illustrated in FIG. 7A to FIG. 7E. Referring to FIG. 7A, a recorded mark $153_1$ with a length 8T where T is a recorded length in the minimum unit in a (1,7) Run Length Limited (RLL) modulated digital recording and a recorded mark $153_2$ with a length 2T are disposed on the same track with a blank mark 161 with a length 2T therebetween. A circle indicated by a solid line is the leading beam 124F which is the plus first order beam, while a circle indicated by a broken line is the main beam 124M which is the 0-th order beam. In addition, a circle indicated by a chain double-dashed line is the minus first order light beam 124R. Here, the (1,7) RLL modulated digital recording is a well-known scheme in which original 2-bit data is converted into 3-bit data with one to 7 "0"s between "1"s which is in turn recorded as an NRZI (Non Return to Zero Inverted) signal. Although the detected clock frequency is 1.5 times the original code, the highest transmission frequency becomes lower and the lowest transmission frequency becomes higher so that transmission can be attained in a narrower frequency band. A (1,7) RLL pulse consists of seven kinds of pulse from 2T to 8T. The frequency of a 2T pulse is one fourth of the clock frequency. Therefore, the frequency of an 8T pulse is ¹⁄₁₆ of the clock.

When the leading beam 124F and the main beam 124M pass over the recorded marks 153-1 and 153-2 and the blank mark 161, the response waveforms from them are shown in FIG. 7B. The waveform 162F indicated by a solid line is by the leading beam 124F, and the waveform 162M is the one by the main beam 124M. Since the signal waveform of the leading beam 124F is amplified by the variable amplifier 132, both waveforms have the same height.

A difference output of the differential amplifier 133 is shown in FIG. 7C. Since the difference between both waveforms shown in FIG. 7B is determined, the waveforms indicating the difference output have different polarities at the start and end of read out of the recorded marks 153-1 and 153-2.

The result of differentiation of the waveforms shown in FIG. 7C by the differentiator 134 is shown in FIG. 7D.

Output waveforms of the zero cross detector 135 are shown in FIG. 7E. Rising and falling pulse waveforms 165-1 and 165-2 are alternately obtained at each zero cross point of the waveforms shown in FIG. 7D. These pulse waveforms 165-1 and 165-2 correspond to the locations where the recorded marks 153-1 and 153-2 shown in FIG. 7A exist so that it is found that information recorded on the optical disk 111 is played back.

The optical record playback apparatus of this embodiment can play back information even if the minimum width T of a recorded mark is about 0.1 times the laser wavelength.

As described above, according to the invention, signals represented by the recorded marks can be played back by alternately detecting the start and end of each recorded mark at a timing when each zero cross point of the differentiated signal is detected. Therefore, since the start and end points of a recorded mark with a length shorter than 0.5 times the laser wavelength, for example, a length as short as 0.1 times the laser wavelength, are alternately detected, respectively at the timing when each zero cross point is detected, the linear recording density can be significantly improved so that the linear velocity can be reduced by lowering the area per recorded bit. In addition, if the disk has the same rotation speed as that of a conventional one, the transfer rate can be significantly increased.

Moreover, according to the present invention, since the signal level of detected output is adjusted to make the difference between the peaks of detected outputs of two light beams reduced, the zero cross points accurately indicate the start and end points of a recorded mark so that accurate playback of the recorded marks can be performed.

Furthermore, according to the present invention, since information recorded on the disk is played back by using two light beams selected from the 0-th, plus and minus order diffracted beams which are obtained from single light beam by diffraction, adjacent light beams can be easily and stably obtained.

It is apparent that the present invention is not limited to the above embodiments but may be modified and changed without departing from the scope and spirit of the present invention.

What is claimed is:

1. An apparatus for playing back an optical record comprising;

irradiating means for irradiating a track with at least two light beams having the same wavelength and overlapping on said track along a scanning direction;

a first detector for detecting signals of reflected light of said two overlapping light beams from at least one recorded mark on said track;

a differentiator for differentiating a difference signal between said signals detected by said first detector; and signal processing means for generating a playback signal corresponding to said recorded mark according to said differentiated signal output from said differentiator.

2. The apparatus as claimed in claim 1, wherein said two light beams are a 0-th order diffracted beam and one of a plus and minus first order diffracted beams generated by passing a single light beam through a diffraction grating.

3. The apparatus as claimed in claim 1, further comprising;

adjusting means for adjusting at least one of said signals detected by said first detector so as to reduce a difference between peaks of said signals detected by said first detector.

4. The apparatus as claimed in claim 2, further comprising;

adjusting means for adjusting said signal detected by said first detector of said plus or minus first order diffracted beam so as to reduce a difference between peaks of said signals detected by said first detector of said 0-th order diffracted beam and said plus or minus first order diffracted beam.

5. The apparatus as claimed in claim 1, wherein said signal processing means further comprises;

a second detector for detecting a zero cross point of said signal differentiated by said differentiator; and a third detector for detecting a trailing edge of said recorded mark along said track according to said zero cross point.

6. The apparatus as claimed in claim 1, further comprising;

a second detector for detecting a zero cross point of said signal differentiated by said differentiator: and a third detector for detecting a start or end of said recorded mark according to a timing of a detection of said zero cross point.

7. The apparatus as claimed in claim 5, wherein said signal processing means outputs alternately a rising pulse signal and a falling pulse signal every time said zero cross point is detected by said second detector in which said pulse signals correspond to a trailing edge of said recorded mark.

8. A method for playing back an optical record, comprising the steps of:

scanning a track with at least two light beams having the same wavelength and overlapping on said track along a scanning direction;

detecting signals of reflected light of said two overlapping light beams from at least one recorded mark on said track;

differentiating a signal indicating a difference between said detected signals; and generating a playback signal corresponding to said recorded mark according to said differentiated signal.

9. The method as claimed in claim 8, wherein said two light beams are a 0-th order diffracted beam and one of a plus and minus first order diffracted beams generated by passing a single light beam through a diffraction grating.

10. The method as claimed in claim 8, further comprising the step of;

adjusting at least one said detected signal so as to reduce a difference between peaks of said detected signals.

11. The method as claimed in claim 9, further comprising the step of;

adjusting said detected signal of said plus or minus first order diffracted beam so as to reduce a difference between peaks of said detected signals of said 0-th order diffracted beam and said plus or minus first order diffracted beam.

12. The method as claimed in claim 8, wherein said generating step comprises the steps of;

detecting a zero cross point of said differentiated signal; and detecting a trailing edge of said recorded mark along said track according to said zero cross point.

13. The method as claimed in claim 8, wherein said generating step comprises the steps of;

detecting a zero cross point of said differentiated signal; and detecting a start or end of said recorded mark according to a timing of detecting said zero cross point.

14. An apparatus for playing back an optical record comprising;

a light source for generating single a light beam;

a diffraction grating for generating 0-th, plus and minus order diffracted beams from said single light beam;

focusing optics for focusing at least two of said 0-th, plus and minus first order diffracted beams on a track of an optical disk in which said light beams overlap in their scanning direction;

a first detector for detecting signals of reflected light of said two light beams focused by said focusing optics from at least one recorded mark on said track, in which said recorded mark represents a prerecorded information;

a differential amplifier for outputting a difference signal between said two signals detected by said first detector;

a differentiator for differentiating said difference signal; and a zero cross detector for detecting a zero cross point of said differentiated signal output from said differentiator an a transition of said recorded mark.

15. The apparatus as claimed in claim 14, wherein said light source is a semiconductor laser device.

16. The apparatus as claimed in claim 14, wherein said zero cross detector outputs alternately a rising pulse signal and a falling pulse signal every time said zero cross point is detected in which said pulse signals correspond to a leading and trailing edge of said recorded mark along said track.

17. The apparatus as claimed in claim 14, further comprising;

a second detector for detecting a tracking error signal according to said reflected light from at least one recorded mark on said track.

18. The apparatus as claimed in claim 14, further comprising;

a second detector for detecting a focus error signal according to said reflected light from at least one recorded mark on said track.

* * * * *